J. L. PRUNTY.
CAMERA.
APPLICATION FILED FEB. 6, 1915.
1,184,488.
Patented May 23, 1916.
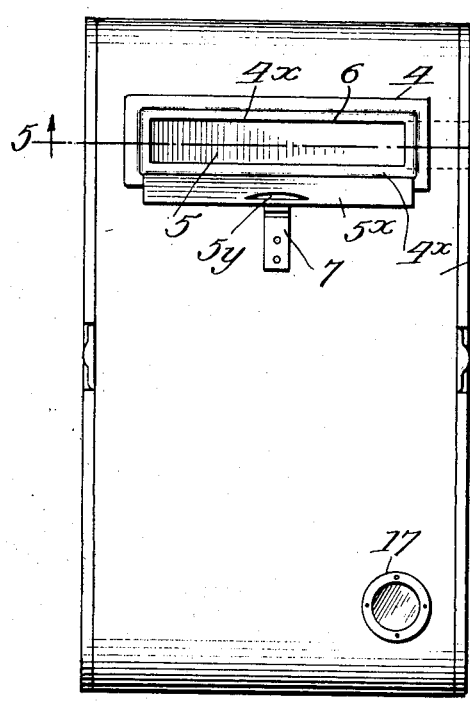
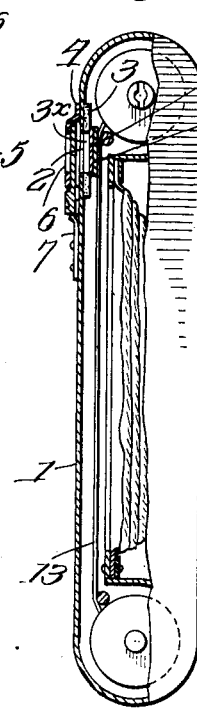
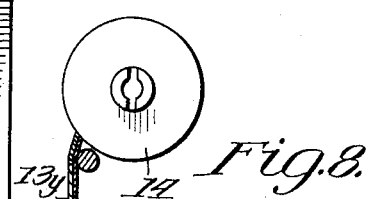
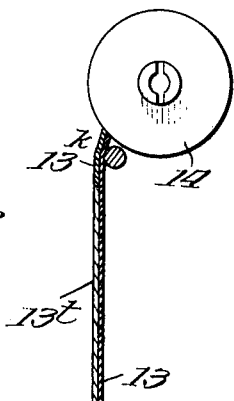
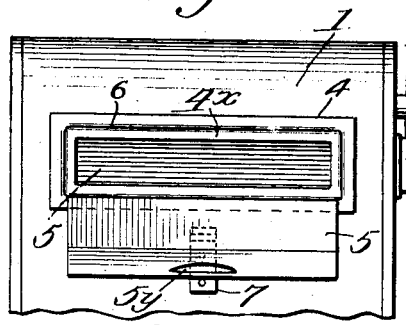
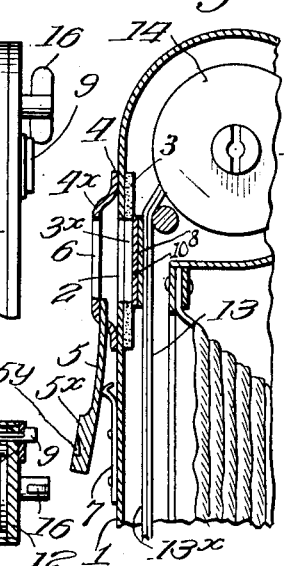
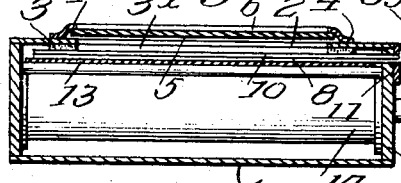
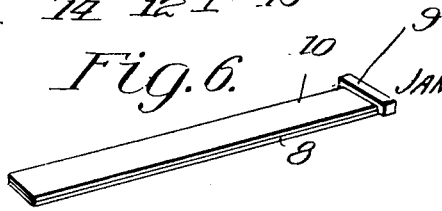
WITNESSES:
S. E. Wade.
L. A. Stanley
INVENTOR
JAMESON L. PRUNTY
BY Munn & Co.
ATTORNEYS

UNITED STATES PATENT OFFICE.

JAMESON LLOYD PRUNTY, OF WAMEGO, KANSAS.

CAMERA.

1,184,488.   Specification of Letters Patent.   Patented May 23, 1916.

Application filed February 6, 1915. Serial No. 6,475.

*To all whom it may concern:*

Be it known that I, JAMESON LLOYD PRUNTY, a citizen of the United States, and a resident of Wamego, in the county of Pottawatomie and State of Kansas, have invented certain new and useful Improvements in Cameras, of which the following is a specification.

My invention relates to improvements in cameras, and it consists in the combinations, constructions, and arrangements herein described and claimed.

An object of my invention is to provide a device by means of which an autograph, title, or other legible matter may be registered upon a film and which, when the film is subsequently developed, will constitute a part thereof and appear in the print which is made in the usual manner from the developed film.

A further object of my invention is to provide a device of the type described in which a slide, having the autographic matter thereon may be inserted in the camera without the necessity of first inserting the slide and then writing or inscribing the autograph or legend.

Other objects and advantages will appear in the following specification, and the novel features of the invention will be particularly pointed out in the appended claims.

My invention is illustrated in the accompanying drawings forming part of this application, in which similar reference characters indicate like parts in the several views, and in which—

Figure 1 is a plan view of a camera provided with my improvement; Fig. 2 is a fragmentary plan view of certain of the parts shown in Fig. 1, showing these parts in different position; Fig. 3 is an edge view of the camera, certain parts being shown in section; Fig. 4 is an enlarged sectional view of a portion of the device, somewhat similar to Fig. 3, but showing certain of the parts in their different positions; Fig. 5 is a section along the line 5—5 of Fig. 1, looking in the direction of the arrow; Fig. 6 is a perspective view of the autographing slide or medium; Fig. 7 is a sectional view showing the film and its backing; and Fig. 8 is a view similar to Fig. 7 showing a modified form of the film backing.

In carrying out my invention I make use of a camera of any suitable type. In the drawing I have shown the invention as applied to a pocket camera of the folding or bellows type which is provided with film spools or reels. In the back 1 of the camera I provide a rectangular opening 2, this opening coinciding with a similar opening $3^x$ in the cross member 3 of the frame of the camera. On the exterior of the back and surrounding the opening 2 I provide a rectangular frame 4 which is provided with upwardly and inwardly bent flanges $4^x$ to form guides for a lightproof slide 5. The slide 5 is designed to enter underneath the flanges $4^x$ through a slot on one side of the guide frame 4 and is limited in its movement by an enlarged stop member $5^x$, the latter being provided with a recess $5^y$ which constitutes a thumb nail hold for removing the slide. The flanges $4^x$ of the guide flange 4 are integral, thereby leaving a central rectangular opening 6 which is covered by the slide 5 when the latter is in its normal position but which may be uncovered by withdrawing the slide. A spring 7 is secured to the back 1 of the camera, and the end of the spring is arranged adjacent to the stop member $5^x$ so that when the latter is in its normal position the spring 7 will retain it. The spring, however, may be pushed downwardly so as to permit the head or stop member $5^x$ to depress the spring, thus permitting the slide 5 to be withdrawn.

In Fig. 6 I have shown the autographing medium which consists of a slide formed of a backing of a piece of transparent celluloid 8 having a head or stop member 9 at one end, one face of the sheet bearing a strip of carbonized paper 10, suitably colored, and greaseless, which is attached to the celluloid strip by its un-carbonized side. The autographing slide or medium is adapted to enter an opening 11 in the side 12 of the camera, and to extend between the protective paper backing $13^x$ of the film 13 and the frame member 3 which is at the back of the camera. When the autographing slide is inserted it is in registration with the openings 2, $3^x$, and 6 as shown in Figs. 3 and 4. In Fig. 7 I have shown the arrangement of the paper backing which is used in connection with the parts thus far described. In this figure the spools or reels 14 and 15 carry the film 13 and its backing $13^x$. At certain intervals on the latter an opening is made which corresponds in shape and size with the openings 2, 3ˣ and 6, this opening being covered with a semi-lightproof covering 13ʸ.

From the foregoing description of the various parts of the device, the operation thereof may be readily understood.

The normal position of the slide 5 is that shown in Figs. 1 and 3. The film is unrolled in the usual manner by turning the key 16 until the indicating number appears before the window 17. The portion 13ʸ of the film backing 13ˣ is now in registration with the opening 3ˣ in the cross member 3. A legend, autograph, or other suitable inscription may be written upon the carbonized surface 10 by means of a pen, pencil, or stylus. This removes the carbon from the paper and light will easily pass through to the film wherever the autograph or inscription is traced. The autographing slide, with the inscription thereon is now inserted in the opening 11, the slide is pushed into the position shown in Fig. 5. Now, by pressing inwardly on the spring 7 the head 5ˣ of the slide 5 may be withdrawn by inserting the thumb nail in the recess 5ʸ, and pulling outwardly. The opening uncovered by the slide 5 may now be exposed for a few seconds to indirect light. The slide 5 is now pushed back into place and the autographing slide may be withdrawn. Upon subsequent development of the film, the autograph or inscription will appear as a part thereof, thus forming a permanent record on the film itself.

The autographing medium or slide of course cannot be used again and should be discarded, a new one being necessary for each autograph written. One feature to which I desire to call attention is the fact that the inscription may be made on the autographing member or slide at any time and does not have to be made at the time a picture is taken.

In Fig. 8 I have shown a modified form of the device, in which the film 13 is provided with a backing 13ᵏ having at intervals a semi-lightproof portion 13ᵗ which covers the portion of the film used for one exposure. In this case, the autograph or inscription may be caused to register at any place on the film, either to form a part of the picture itself or to appear on the margin between the exposures.

I claim:

1. The combination with a film camera having an opening in its back, of a removable closure for said opening, an autographing slide adapted to receive an inscription, said autographing slide being adapted to be inserted in the camera between the film and the opening, and an opaque flexible backing for the film having semi-opaque portions adapted to register with said autographing slide.

2. The combination with a film camera having an opening in its back, of a slide for covering or uncovering said opening, an autographing slide arranged to receive an inscription and adapted to enter the camera adjacent to said opening, and an opaque flexible backing for said film having portions of semi-opaque material, said portions being arranged to register with the opening in the back of the camera.

3. The combination with a film camera having a movable film, of a flexible opaque backing for said film having semi-opaque portions, said camera having an opening in its back, a slide for covering and uncovering said opening, and an autographing plate arranged to receive an inscription and adapted to enter the camera between said opening and the flexible backing of the film.

4. The combination with a film camera having a movable film, of a flexible opaque backing for said film having semi-opaque portions, said camera having an opening in its back, a slide for covering and uncovering said opening, and an autographing plate arranged to receive an inscription and adapted to enter the camera between said opening and the flexible backing of the film, said autographing medium comprising a transparent sheet having removable opaque material disposed thereon.

5. The combination with a film camera having a movable film, of a flexible opaque backing for said film having semi-opaque portions, said camera having an opening in its back, a slide for covering and uncovering said opening, an autographing plate arranged to receive an inscription and adapted to enter the camera between said opening and the flexible backing of the film, said autographing medium comprising a piece of transparent celluloid, and a strip of colored, greaseless carbon paper secured to the celluloid by its uncarbonized side.

JAMESON LLOYD PRUNTY.

Witnesses:
J. W. PRUNTY,
WM. L. PRUNTY.